United States Patent [19]
Laustsen

[11] 3,744,439
[45] July 10, 1973

[54] METHOD OF SUPPLYING REFUSE TO A GAS PRODUCING CHAMBER FOR DISPOSAL OF THE REFUSE AND A REFUSE DISPOSAL PLANT COMPRISING A GASIFICATION CHAMBER

[75] Inventor: Erik Laustsen, Kolding, Denmark
[73] Assignee: Destrugas A/S, Kolding, Denmark
[22] Filed: Nov. 2, 1970
[21] Appl. No.: 85,982

[30] Foreign Application Priority Data
Oct. 31, 1969 Denmark .......................... 5750/69

[52] U.S. Cl. .................. 110/11, 48/209, 201/25, 201/34
[51] Int. Cl. ............................................. F23g 3/00
[58] Field of Search .................... 48/209; 110/11; 201/25, 34

[56] References Cited
UNITED STATES PATENTS

| | | | |
|---|---|---|---|
| 2,276,343 | 3/1942 | Reyerson et al. | 201/34 X |
| 1,777,449 | 10/1930 | Rath | 48/209 UX |
| 3,362,887 | 1/1968 | Rodgers | 48/209 X |
| 3,471,275 | 10/1969 | Borggreen | 48/209 |

Primary Examiner—Carroll B. Dority, Jr.
Attorney—Spencer & Kaye

[57] ABSTRACT

A method of supplying refuse to a gasification chamber by which the refuse is introduced into a feed shaft communicating with the gasification chamber and, in a preheating zone at the lower portion of said shaft, is preheated to a temperature of between 100°C and 400°C for providing superheated steam, and further it is ensured that within the feed shaft always a refuse layer of such a height is present, that steam moving upwards within said shaft from said preheating zone is condensed within the refuse layer and forms a steam pocket upwardly limited by a layer of condensed steam or water, whereby a barring is provided preventing gas from the gasification chamber to depart through the shaft and keeping most of the oxygen and nitrogen of the air contained in the refuse back so that it is prevented that this oxygen and nitrogen is introduced into the gasification chamber.

7 Claims, 2 Drawing Figures

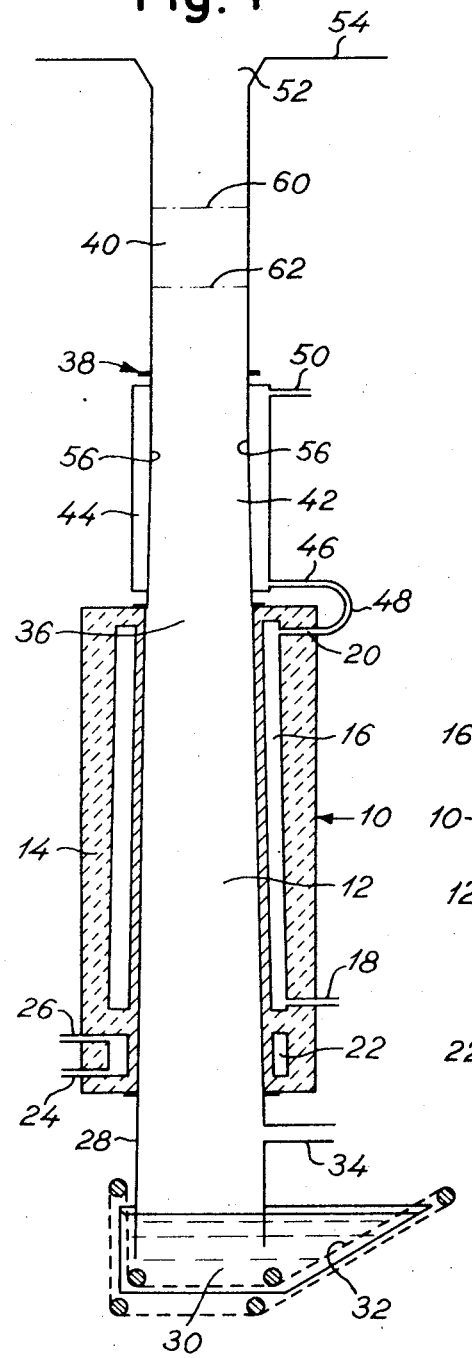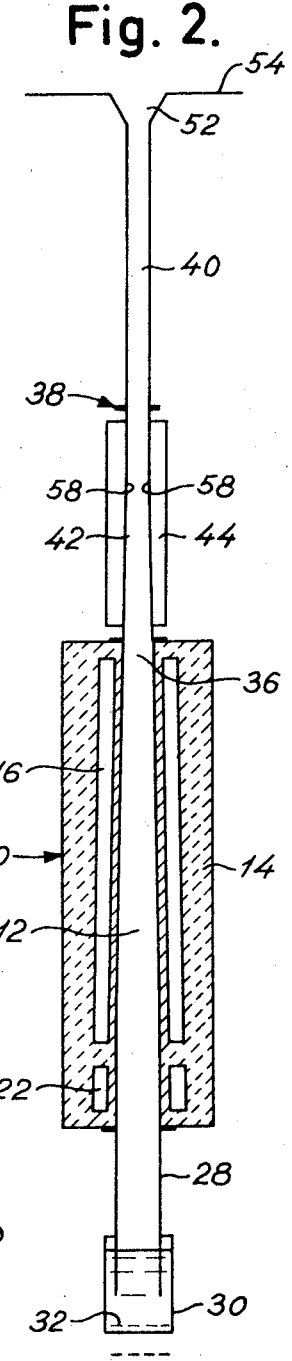

METHOD OF SUPPLYING REFUSE TO A GAS PRODUCING CHAMBER FOR DISPOSAL OF THE REFUSE AND A REFUSE DISPOSAL PLANT COMPRISING A GASIFICATION CHAMBER

This invention relates to a method of supplying refuse, such as garbage, rubbish, sewage sludge or the like essentially organic materials loosely packed, to a gas producing chamber, for example a retort, serving for disposal of the refuse by gasification thereof at temperatures above 800°C.

In hitherto known plants for disposal of refuse by gasification thereof it has been necessary, provided it should be prevented both that gas from the gas producing chamber departs therefrom through the inlet thereof and that together with the refuse too much air is introduced into the gas producing chamber, to feed the refuse into the gas producing chamber by means of a mechanical sluice device, so that at no time free communication is provided between the inner of the gas producing chamber and the surroundings. Experience has shown, however, that even in case such sluice devices are functioning satisfactory by feeding relatively compact materials to be degasified such as coal, when refuse has to be treated it is difficult owing to the non-uniform character of the refuse to avoid leakages, and further it can not be avoided that relatively great amounts of air contained in the refuse are simultaneously conducted into the gas producing chamber where the uncontrollable surplus of oxygen and nitrogen contained in the air results in the production of non-desirable gases and dilution of the produced gas respectively.

An object of the invention is to provide a method as stated above by which it is possible to supply refuse to a gas producing chamber in such a manner that during the feed of the refuse no gas escapes from the gas producing chamber and simultaneously it is prevented that greater amounts of air is introduced into the gas producing chamber together with the refuse.

According to the present invention this may be obtained thereby that the refuse is feeded into the gas producing chamber through an open feed shaft arranged above and freely communicating with the gas producing chamber, that in a lower preheating zone of said feed shaft the refuse is heated to such an extent that when the refuse leaves the preheating zone it has a temperature of between 100°C and 400°C, preferably a temperature of between 100°C and 250°C, and that by continuous or intermittent supplying of refuse to the feed shaft a layer of refuse is maintained in an inlet zone of said feed shaft which inlet zone is disposed above the said preheating zonewhich layer has such a height that no visible steam having passed through the upper surface of the refuse layer is flowing upwards, preferably that no steam is visible at all.

Generally refuse contains relatively great amounts of water and owing to the heating of the refuse within the preheating zone the water contained in the refuse evaporates and the steam thereby obtained is further superheated so that within the preheating zone the refuse is mixed with superheated steam. Experience has shown that the steam to be found in the preheating zone has its maximal pressure approximately at the middle of the preheating zone. A great part of this superheated steam will be pressed upwards into the inlet zone of the feed shaft where it contacts the non-preheated refuse which results in condensation of the steam and, provided the layer of refuse contained in the inlet zone is of sufficiently height, that at a certain level of the inlet zone a steam pocket containing saturated steam is provided which is at its top limited by a thin layer of condensed steam. It has been found that, provided the gas producing chamber is working under constant working conditions, this steam pocket and the appurtenant layer of condensed steam will always be located at a stationary level and further that it effectively prevents steam and malodorous gases developed by the heating or the refuse within the preheating zone from penetrating upwards through the refuse above the steam pocket. Furthermore it has been found that the said steam pocket or the layer of condensed water limiting it is able to expell in any case the greater part of the oygen and of the nitrogen from the air contained in the refuse so that said oxygen and nitrogen is discharged from the top of the feed shaft without being carried with the refuse into the gas producing chamber. The ability of the steam pocket effectively to prevent escape of gas from the gas producing chamber through the feed shaft even when, as for example it is the case when the gas producing chamber is constituted by a retort working with suction from below the gas in the upper part of the gas producing chamber is under a relatively great over-pressure, is essentially supported by the expansion of the refuse due to the heating thereof resulting in a compression of the refuse along the side walls of the preheating zone where the gas has the greatest tendency to pass upwards, whereby the escape of gas here is effectively counteracted by the compressed refuse itself.

It should be noted that, with such a variable material as refuse, it is not possible to establish fully constant working conditions of the gas producing chamber, since refuse of different composition will pass the gas producing chamber at different rates. Therefore, also the rate at which the refuse is passing through the feed shaft may vary rather considerably, and since the location of the steam pocket is, among other things, depending on the rate of movement of the refuse through the feed shaft, in practice the thickness of the refuse layer in the inlet zone ought to be maintained larger than the minimum thickness ensuring that discharge of steam from the upper surface of the refuse layer does not, generally, occur; which minimum thickness can easily be ascertained experimentally.

On the other hand, it has proved without importance whether feeding of the refuse is effected continuously, in such a manner that the surface of the refuse layer in the feed shaft remains fairly constant, or whether feeding of the refuse is effected intermittently, provided that steps be taken to ensure that the upper surface of the refuse layer is always above a certain level.

An object of the invention is also to provide a plant for disposal of refuse by gasification thereof at temperatures above 800°C comprising a gasification chamber having an inlet and being adapted for being supplied with refuse by the above stated method.

Further objects, advantages, and features of the present invention will be more fully understood from the following detailed description in connection with the accompanying drawing, in which FIG. 1 diagrammatically illustrates a longitudinal sectional view of a gasification chamber of a plant for disposal of refuse, which chamber is embodied as a vertical retort and is provided with a feed shaft, and FIG. 2 also diagrammatically illustrates a longitudinal sectional view of the retort shown in FIG. 1 but taken at right angle to FIG. 1.

In the drawing 10 indicates an ordinary retort having a gasification chamber 12 that is enclosed by walls 14 of a refractory material and in which is provided a heating chamber 16, shown for convenience as one single chamber but generally consisting of a large number of ducts or flues, to the bottom end of which, through an inlet 18, are conducted combustion products at a high temperature, for example about 1,500°C, which combustion products are discharged at the upper end of the retort 16 through an outlet 20. The lower portion of the retort 12 is provided with a cooling jacket 22 through which cooling air is passed from an inlet 24 to an outlet 26.

The bottom of the retort 10 communicates with a slag funnel 28 reaching down into a water-filled container 30 provided with a slag-conveyor 32 operating along the bottom of the container and by means of which the slag and ashes produced in connection with the gas-production are carried away from the retort. The rate of removal is controlled so that above the water level in the container 30 a layer of ashes and slag is maintained reaching above the portion of the chamber 12 enclosed by the cooling jacket 22.

The retort 10 shown is of the type by which removal of the gas takes place by suction from below, for which reason the slag funnel 28 is provided with a gas-outlet 34 connected to a suction pump, not shown.

Refuse is supplied to the retort 10 through a feed shaft 38, which is arranged on top of the retort 10 with its outlet directly communicating with the inlet 36 of the retort 10. The shaft 38 that is made from steel plate, forms a through passage and is open also at its top end. The shaft 38 is relatively high. The feed shaft 38 is composed by two interconnected sections, namely an upper inlet shaft 40 having parallel walls and a lower pre-heater 42 surrounded by a heating jacket 44. This heating jacket is at its lower end provided with an inlet 46 which is by means of a tube 48 connected to the combustion-product outlet 20 of the retort 10. At its upper end the heating jacket 44 is provided with an outlet 50 which is in a manner not shown connected to a recuperator. The inlet shaft 40 is at its upper end provided with a hopper portion 52 having its opening at a working platform 54 from which refuse can be filled directly into the inlet shaft 40.

The narrow walls 56 of the pre-heater 42 are slightly inclined outwards and downwards, although to a relatively limited extent, so that between them they define an apex angle of between 1° and 2°. This applies also to the side walls 58 of the pre-heater. In the same manner as the retort chamber 12, the pre-heater 42 and the inlet shaft 40 are of rectangular cross section, but the side walls have an outward camber as is customary in such retorts.

When the plant is operating, the refuse within the retort chamber 12 will, as known per se, be gasified through dry distillation, if possible, combined with partial combustion as a consequence of oxygen released through the distillation as well as with pyrolysis, whereby the gasification will reach such a state of completion that all organic matter, including plastics, of which large quantities are contained in present day garbage and wastes, is completely decomposed and, it appears, without development of any slag adhering to the retort walls. Even glass, where contained in the garbage, appears not to give rise to development of any slag agglomeration of importance, the glass being found in the form of pearls of relatively small diameter in the solids, consisting of ashes and relatively fine grained slag, discharged at the bottom end of the retort 10.

Since the retort 10 shown is adapted for withdrawal of the gas from the bottom thereof, it cannot be avoided that, in the vicinity of the retort inlet 36, gas of a certain over-pressure develop. Such gas will not, however, be able to escape through the feed shaft 38, in spite of this shaft being open at the top, owing to the treatment to which the refuse, such as garbage or sewage sludge, is exposed while descending through the pre-heater 42.

Due to the heating jacket 44 surrounding the pre-heater 42 and the high temperature of gases passing through this jacket, the refuse within the pre-heater will be heated to a rather high temperature, whereby the moisture normally to be found in the refuse, or added if required, will evaporate. This evaporation involves cooling of the refuse, and the heating of the refuse obtained in the pre-heater 42 ought to be adjusted so that the refuse, when reaching the inlet 36 of the retort, has a temperature of approximately 200°-250°C in the zone next to the walls 56 and 58 of the pre-heater and at least 120°C in the central part of the refuse, that is to say, in the middle of the space between the walls.

It has to be noted that temperatures as high as 400°C of the refuse or parts thereof leaving the pre-heater 42 may be tolerated. On the other hand it can not be avoided that owing to the pre-heating the refuse gives of within the pre-heater some gases and as more as higher the temperature of the refuse is. However, this gas generation within the pre-heater ought to be kept as low as possible, and particularly it should be avoided as far as possible that the steam produced by the pre-heating is able to convert with the carbon contained in the refuse. Therefore, it has shown to be most convenient that care is taken that normally the refuse within the pre-heater is not heated to temperatures much above 250°C.

When the heating of the refuse within the pre-heater 42 is controlled as stated above the steam produced therein will be superheated, and it will have its maximum pressure approximately midway between the upper and lower ends of the pre-heater 42. From there as a consequence of the pressure, the steam will tend to pass upwards towards the inlet shaft 40 as well as downwards towards the retort chamber 12. This last effect, in connecton with the expansion of the refuse necessarily resulting from the pre-heating, involving in turn a relatively high degree of compaction of the refuse, particularly in zones close to the walls 56 and 58 of the pre-heater, results in, that the gas at the upper end of the retort chamber 12, although having a certain over-pressure, being detained by the downward-moving superheated steam which, in moving downwards through retortchamber 12, comes into contact with the carbon contained therein, thereby converting this carbon into gas. Hence, the steam is a factor contributing to the attainment of complete gasification or pyrolysis of all organic matter in the waste, and to improvement of the properties of the gas produced, as well as to the amount of gas obtained. The superheated steam moving from the central part of the preheater 42 upwards towards and into the inlet shaft 40 will encounter in the said shaft refuse that has not received any pre-heating. Consequently it will, in the first instance, be cooled and establish a pocket of satuated steam a short distance above the bottom end of the shaft 40. This saturated steam will, moreover, penetrate slightly further up into the refuse and will thereby condense whereby the steam pocket will be given an upper bordering layer consisting of condensed steam or water, filling the interstices between and within the components of the refuse and expelling in turn the greater part of the air contained in these interstices. This air is thereby forced upwards and is discharged through the open upper end of the shaft 40. It has been found, however, that some of the gases which besides oxygen and nitrogen are contained in the air, thus some of the carbon-dioxide and the major part of the malodorous gases, such as hydrogen sulphide developed during the storage of the refuse prior to its being introduced into the feed shaft and still being retained in the waste, is absorbed by the condensed steam and thereby deposited on the refuse moving through the steam pocket bordering layer, so that such gases together with the refuse are moved into the pre-heater. Hence, the air forced upwards and discharged through the inlet shaft 40 will be practically odourless.

The formation of the barring stated, preventing escape of gas from the upper end of the retort chamber 12 and penetration of air into the retort chamber imply, however, the maintenance of a certain minimum depth of the refuse layer within the inlet shaft 40, and therefore that the upper surface of the refuse layer within the inlet shaft 40 is always above a certain minimum level, for example as indicated by a dot-and-dash line 60, irrespective of the refuse is feed continuous or intermittent.

In case for some time no fresh refuse is fed into the inlet shaft 40 and, consequently, the level of the refuse within the shaft 40 sinks, for example to the level indicated by the dot-and-dash line 62, waves of steam will be seen to appear at the free surface of the refuse layer. This is a warning indicating that immedate replenishment of the refuse in the feed shaft is required. When the said waves of steam appear, and they are plainly visible, the barring preventing escape of gas from the retort 12 through the feed shaft 38 will, in fact, still be effective, but the layer of condensed steam constituting the upper bordering layer of the steam pocket will not be concentrated enough to prevent penetration of at least some oxygen and nitrogen into the retort 12. Furthermore, under normal operation of the plant, the level 62 at which the said visible steam waves appear will, depending on the composition of the refuse, be varying, up or down, within certain limits, wherefore the minimum refuse level 60 to be maintained within the inlet shaft 40 should be well above the level at which such steam waves have been experimentally observed. Since the pre-heater 42 may have a height of, for example, 2 to 2½ metres, and the inlet shaft 40 a height of 2½ to 3 metres, there will in practice generally not be any difficulty in fixing a minimum depth of the level 60 that will with great certainty ensure maintenance of the barring established by means of the pre-heater 42 in connection with the inlet shaft 40.

In spite of the refuse in the pre-heater 42 expanding and being in turn compacted, it will not form a plug in the pre-heater, the established conditions, the walls of the pre-heater being of smooth steel plates, combined with the slight downward widening of the pre-heater, ensure that the refuse to be found in the pre-heater will be pressed steadily downward by the material on top thereof and into the retort 12, in suitable timing with the chain conveyor 32 removing slag and ashes from the bottom of the retort.

The said widening of the pre-heater in downward direction should however, be relatively moderate and should not, preferably, exceed a widening corresponding to an apex angle of 5° and it ought to be much less if possible for example less than 2°, which will be adequate to ensure prevention of development of a plug, without the compaction being too low.

Generally, ordinary domestic garbage will be so moist that it contains adequate amounts of water to ensure the required development of steam in the pre-heater 42 and sufficient low temperatures of the refuse leaving the pre-heater. If, on the other hand, the refuse consists to a large extent of industrial waste or garbage originating from large present-day housing blocks, the moisture may be inadequate, in which case supplementary water should be added, prior to the refuse being fed into the feed shaft 38 or while the refuse is contained herein. Where sewage sludge has to be disposed with together with garbage the supplementary water may be obtained through suitable mixing of such sludge with the too dry garbage. When such particularly moist refuse is not available, or in case the amounts of moist refuse available are inadequate, supplementary water can be sprayed on or injected.

It is also possible, however, to supply to the interior of the pre-heater 56 superheated steam generated in other manners, such steam furnishing in itself an essential part of the heating of the refuse in the pre-heater 42 and, in addition, the amount of steam required with a view to securing the barring. If convenient, the heating of the refuse in the pre-heater may be effected solely by means of such superheated steam. In such cases the heating jacket 44 may be omitted.

In the plant shown schematically hereinbefore, the combustion products exhausted from the retort 10 are in their entirely passed through the heating jacket 44, which involves that a temperature of about 900°C wil be found at its inlet 46, and a temperature of about 600°C at its outlet 50. Where the amounts of the combustion gasses discharged from the retort 10 are so large, however, that excessive heating of the refuse in the pre-heater 42 may result, and consequently the drop of temperature within the heating jacket essentially reduced steps may be taken to secure that only part of the combustion products leaving the retort 10 are passed through the heating jacket 44.

It should also be mentioned that frequently in practice the heating chamber 16 of the retort 10 is divided into two or more zones to which the hot combustion products are supplied independently and in such cases it will generally be the combustion products from only one of these zones that are passed through the heating jacket 44.

The method according to the present invention and, consequently, a feed shaft comprising a lower pre-heating section and an upper inlet shaft may be used independent of the construction of the gasification chamber, for example in connection with converters consisting of a substantially horizontal rotating retort cylinder. Further in many cases, for example when the gasification chamber is constituted by a rotating retort cylinder, it may further be convenient between the lower end of the feed shaft pre-heating section and the inlet of the gasification chamber to insert a suitable conveyor.

What I claim is:

1. In a method of supplying refuse to a gasification chamber serving for disposal of the refuse by gasification thereof at temperatures above 800°C, the steps of feeding said refuse into an open feed shaft arranged before and communicating with an inlet opening of said gasification chamber; heating said refuse, during its passage of a pre-heating zone of said feed shaft disposed at the lower portion thereof, in such a degree that, when the refuse leaves said preheating zone it has a temperature of between 100°C and 400°C; and maintaining, by continuous or intermittent supplying of refuse to said feed shaft, in an inlet zone thereof disposed above said pre-heating zone, a layer of refuse having such a height that at the upper surface of said layer no visible steam appears having passed through the upper surface of said layer of refuse.

2. A method as defined in claim 1; said refuse being heated within said pre-heating zone of said shaft to such an extent that, when the refuse leaves said pre-heating zone, it has a temperature of between 100°C and 250°C.

3. In a method as defined in claim 1; the step of adding water to said refuse prior to or during the feeding of said refuse into said inlet shaft.

4. In a method as defined in claim 1; the further step of introducing steam into said refuse during its passage of said pre-heating zone of said inlet shaft.

5. A method as defined in claim 4; said steam being superheated.

6. A method as defined in claim 1; said heating of said refuse within said pre-heating zone at least partly being obtained by external heating of the part of the wall of said feed shaft enclosing said pre-heating zone.

7. A method as defined in claim 5; said heating of said refuse within said pre-heating zone of said shaft being essentially effected by introducing of superheated steam into said pre-heating zone.

* * * * *